United States Patent [19]
Leuthold et al.

[11] Patent Number: 5,710,678
[45] Date of Patent: Jan. 20, 1998

[54] DISC DRIVE WITH SELF-PRESSURIZING FLUID BEARING AND SHAFT-SUPPORTING-BALL RETAINING ELEMENT

[75] Inventors: Hans Leuthold; David John Jennings, both of Santa Cruz; Lakshman Nagarathman, Capitola; Steve Gonzalez, Davenport; Dean A. Tarrant, San Jose; Gunter Heine, Aptos, all of Calif.

[73] Assignee: Seagate Technology, Inc., Scotts Valley, Calif.

[21] Appl. No.: 478,975

[22] Filed: Jun. 7, 1995

Related U.S. Application Data

[62] Division of Ser. No. 328,493, Oct. 25, 1994, and a continuation of Ser. No. 279,195, Jul. 22, 1994, abandoned.

[51] Int. Cl.$^6$ ................................................ G11B 19/20
[52] U.S. Cl. ................................................ 360/99.08
[58] Field of Search .......................... 360/99.08, 98.07, 360/99.04; 310/67 R, 90; 384/107, 108, 109

[56] References Cited

U.S. PATENT DOCUMENTS

| | | | |
|---|---|---|---|
| 4,577,248 | 3/1986 | Cantwell | 360/99.04 |
| 4,656,545 | 4/1987 | Kakuta | 360/98.07 |
| 4,779,165 | 10/1988 | Elsaesser et al. | 360/99.08 |
| 4,780,777 | 10/1988 | Biermeier et al. | 360/98.07 |
| 5,193,084 | 3/1993 | Christiaens | 360/99.08 |
| 5,210,665 | 5/1993 | Nishizawa | 360/99.01 |
| 5,284,391 | 2/1994 | Diel et al. | 36/99.12 |
| 5,457,588 | 10/1995 | Hattori et al. | 360/99.08 |

FOREIGN PATENT DOCUMENTS

| | | | |
|---|---|---|---|
| 0815703 | 10/1951 | Germany | 360/99.08 |
| 4-358350 | 12/1992 | Japan | 360/98.07 |

*Primary Examiner*—Craig A. Renner
*Attorney, Agent, or Firm*—Flehr Hohbach Test Albritton & Herbert LLP

[57] ABSTRACT

The present invention replaces the current spindle motor ball bearing system of a hard disc drive by a system comprising three separate elements, including a self-pressurizing journal bearing for establishing radial stiffness which comprises a rotating shaft and sleeve with air or other fluid therebetween. A chevron or herringbone pattern is established on the sleeve or shaft to establish a self-pressurizing hydrodynamic bearing which maintains the stability of the system while providing for very simple manufacturing of the system. Additionally, a thrust bearing is defined based on the air pressure build-up between the housing for the disc stack and the disc stack itself. The term "integrated air-bearing" is used to name this thrust bearing because it is built up with components such as discs and housing which exist in any typical hard disc assembly. The integrated air-bearing may be sufficiently established by building up the bottom surface of the housing or the base of the housing to within a very close distance of the lower surface of the disc; preferably, both the top surface of the top disc and bottom surface of the bottom disc are located close to pads, or other configurations are built up to define a narrow gap between the top and bottom surfaces of the disc stack and the housing. Third, an axial elastic thrust bearing defines the axial position of the disc stack at rests and avoiding contact between the surfaces forming the integrated air-bearing (in other terms, disc and housing). This elastic thrust bearing comprises a ball fixed to the shaft that rest against an elastic shield fixed to the end sleeve of the journal bearing or the base of the disc drive. This bearing defines the axial position of the disc stack.

19 Claims, 9 Drawing Sheets

DISC DRIVE WITH SELF-PRESSURIZING FLUID BEARING AND SHAFT-SUPPORTING-BALL RETAINING ELEMENT

This is a division of application Ser. No. 08/328,493 filed Oct. 25, 1994, and is a continuation application of Ser. No. 08/279,195, filed on Jul. 22, 1994, now abandoned.

FIELD OF THE INVENTION

The present invention relates to the field of hydrodynamic bearing assemblies and other related assemblies of the type which provide support for a rotating high speed spindle element. More specifically, the present invention relates to hydrodynamic bearing assemblies used alone and in combination with other assemblies in a disc drive system.

CROSS REFERENCE TO RELATED APPLICATIONS

This application utilizes features of the hydrodynamic bearing disclosed in the application entitled Single Plate Hydrodynamic Bearing with Self-Balancing Fluid Level and Fluid Circulation U.S. Pat. No. 5,487,608 issued Jan. 30, 1996 and the features disclosed in Squeeze Film Damping for a Hard Disc Drive U.S. patent application Ser. No. 08/278,796 filed Jul. 22, 1994 as well as the application entitled Single Plate Hydrodynamic Bearing with Self-Balancing Fluid Level U.S. patent application Ser. No. 08/279,199 filed Jul. 22, 1994 which are filed simultaneously herewith and incorporated herein by reference.

BACKGROUND OF THE INVENTION

Figure 1:
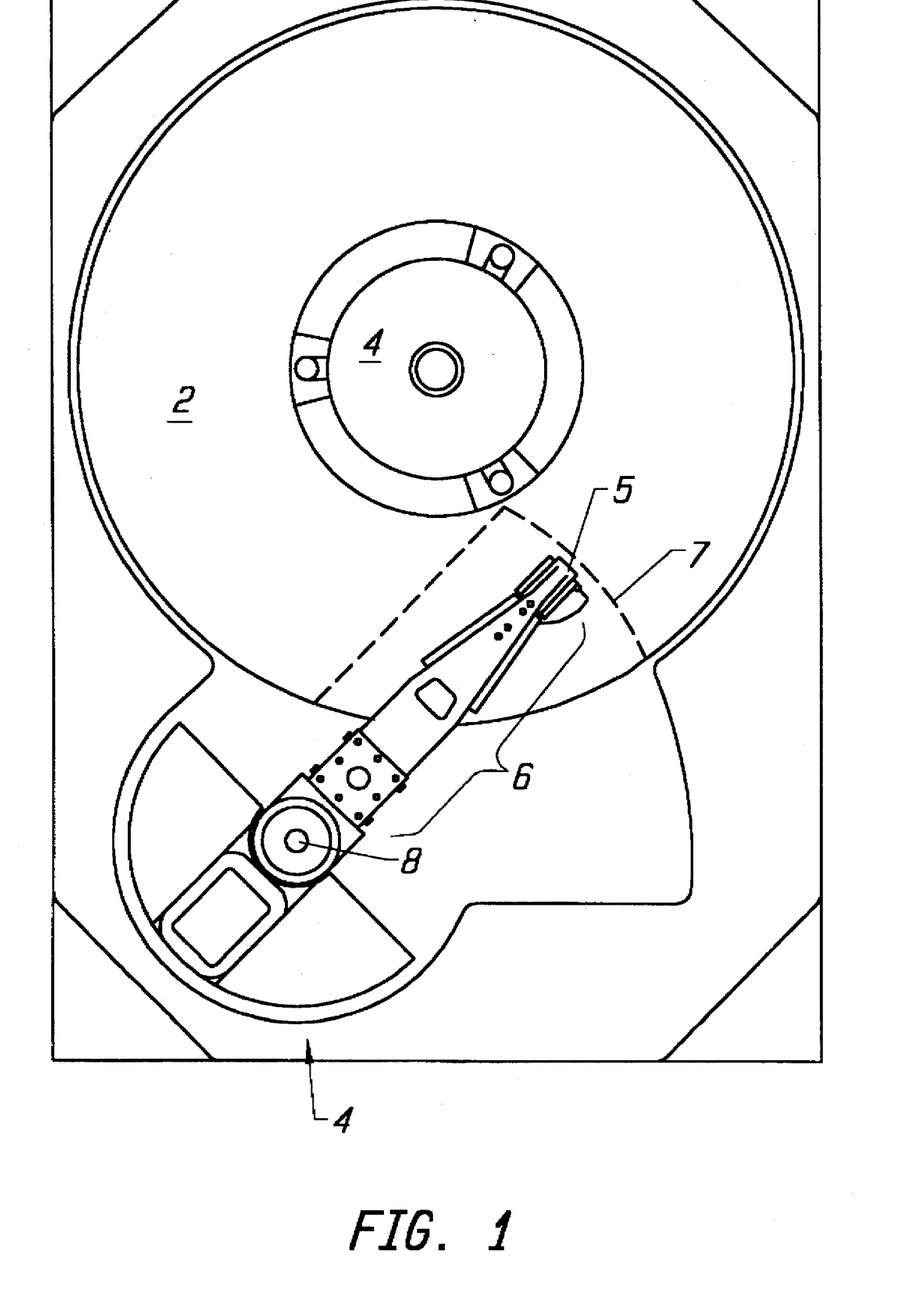
FIG. 1 is a top plan view of a typical disc drive illustrating the primary elements thereof.

Disc drive memory systems have been used in computers for many years for storage of digital information. Information is recorded on concentric memory tracks of a magnetic disc medium, the actual information being stored in the form of magnetic transitions within the medium. As shown in FIG. 1, the discs 2 themselves are rotatably mounted on a spindle 4, and information is accessed by means of read/write heads 5 generally located on pivoting arms 6 which move around pivot 8 over the surface 7 of the disc. The read/write heads, or transducers, must be accurately aligned with the storage tracks on the disc to ensure proper reading and writing of information.

During operation, the discs are rotated at very high speeds within an enclosed housing by means of an electric motor generally located inside the hub or below the spindle. One type of motor in common use is known as an in-hub or in-spindle motor. Such in-spindle motors typically have a spindle which is mounted by means of two ball bearing systems to a motor shaft disposed in the center of the hub. One of the bearings is typically located near the top of the spindle and the other near the bottom. These bearings allow for rotational movement between the shaft and the hub while maintaining accurate alignment of the spindle to the shaft. The bearings themselves are normally lubricated by grease or oil.

The conventional bearing system described above is prone, however, to several short comings. First is the problem of vibration generated by the balls rolling on the raceways. Ball bearings used in hard disk drive spindles run under conditions that generally guarantee a physical contact between raceways and balls, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating disk. This vibration results in misalignment between the data tracks and the read/write transducer. This source of vibration limits therefore the datatrack density and the overall performance of the disc drive system.

Another problem is related to the application of hard disk drives in portable computer equipment and the resulting requirements in shock resistance. Shocks create relative acceleration between the disks and the drive casting which in turn shows up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions. This is a significant draw back since the tendency in the disc drive industry has been to continually shrink the physical dimensions of the disc drive unit.

In an attempt to overcome the problem associated with such traditional ball bearing systems, and attain higher track densities, companies in the disc drive industry are focusing their attention on alternatives to the current spindle-bearing designs. What is needed is a system for supporting the rotating parts in a spindle motor and disc for a magnetic recording system which offers simple construction yet is capable of being manufactured at low cost and in high volume.

SUMMARY OF THE INVENTION

The present invention replaces the current spindle motor ball bearing system of a hard disc drive by a system comprising three separate elements, each of which provides a significant contribution to the stability, stiffness and/or damping of the disc. In this way, tilting or vibratory motion of the disc relative to the transducer even under high speed long-term operating conditions is minimized, so that the transducer may be reliably flown along the data tracks on the surface of the disc. Any one of the three elements to be described below provides significant benefit to the operating system and may be used separately as well as in combination with the other portions of the overall design. Together, the hard disc system described herein provides for a reliable stable disc drive system, which may be easily and reliably assembled and operated over the long term.

In a preferred embodiment, the system includes a self-pressurizing journal bearing for establishing radial stiffness which comprises a rotating shaft and sleeve with air or other fluid therebetween. In a preferred embodiment, a chevron or herringbone pattern is established on the sleeve or shaft to establish a self-pressurizing hydrodynamic bearing which maintains the stability of the system while providing for very simple manufacturing of the system. The choice of the fluid used in the journal bearing described above is defined by the following factors: if the ambient air constitutes the fluid, the problems of lubricant migration and outgassing into the disc drive is essentially eliminated. The use of liquid lubricants such as oils leads to less stringent mechanical tolerances since higher viscosity allows bigger bearing gaps for equivalent stiffness and damping.

Additionally, to provide further stability and stiffness to the system which a mechanical ball bearing will usually intrinsically provide but a hydrodynamic bearing does not, a thrust bearing is defined based on the air pressure build-up between the housing for the disc stack and the disc stack itself. The term "integrated air-bearing" is used to name this thrust bearing because it is built up with components such as discs and housing which exist in any typical hard disc assembly. The integrated air-bearing may be sufficiently established by building up the bottom surface of the housing or the base of the housing to within a very close distance of the lower surface of the disc; preferably, both the top surface of the top disc and bottom surface of the bottom disc are located close to pads, or other configurations are built up to define a narrow gap between the top and bottom surfaces of the disc stack and the housing. The large diameter of this thrust bearing provides the desired moment/rocking/tilting stiffness between the disc stack and the base. It is obvious that the integrated air-bearing is distributed over a sector corresponding to roughly three quarters of the discs only; the remaining quarter being left out to provide a scanning area for the read/write heads which are mounted on pivoting arms (FIG. 1, items 5 or 6). In a preferred embodiment, again a chevron or herringbone-type pattern is established on the built-up surfaces adjacent the top and bottom of the disc stack. Alternatively, a herringbone pattern may be defined on an outer unused portion of the surface of the disc to coact with the built-up surface of the housing or air-bearing pad.

A third major portion of the disc support system is the use of an axial elastic thrust bearing defining the axial position of the disc stack at rest and avoiding contact between the surfaces forming the integrated air-bearing (in other terms, disc and housing). This elastic thrust bearing comprises a ball fixed to the shaft that rests against an elastic shield fixed to the end sleeve of the journal bearing or the base of the disc drive. This bearing defines the axial position of the disc stack. It can be seen that the thrust load across the ball is the sum of the gravitation of the disc stack and the magnetic attraction between the stator and the magnet of the spindle motor. The magnetic attraction between magnet and stator is defined by the axial location of the magnet with respect to the stator and the difference in length of the magnet section overhanging the stator on either side. The resulting force compensates for the gravitation in any position of the drive to provide a contactless position for the integrated air-bearing described above. The present invention is especially characterized by its simple construction and relatively low cost and ease of assembly. Because the drive itself is operating in ambient air in the preferred embodiment which uses all of the elements of the description, there is less need to achieve an ideal hermetic seal for the motor assembly. Also, since the air of the disclosed bearings is chemically stable, the problem of outgassing in to the disc drive environment is essentially eliminated. Moreover it results in a disc drive which is virtually noiseless and vibration free.

Comparison Between the Integrated Air-bearing of this Invention and the Squeeze Film Damper Described in the Incorporated Application, Attorney Docket No. A-59758/JAS A comparison of the two devices based on a comparison of their components might lead to the conclusion that both inventions basically are identical. However, a person skilled in the art will notice the following fundamental difference:

The squeeze film damper is designed to be used in conjunction with a ball bearing system that provides mechanical stiffness to the rotating disc(s) but lacks mechanical damping. Mechanical vibration of the disc will squeeze and displace the fluid film in the damper. The resulting mechanical forces are essentially proportional to the velocity of the vibration and are therefore qualified as damping.

The integrated air-bearing is designed to be used in conjunction with a hydrodynamic bearing system that provides sufficient mechanical damping to the rotor and disc assembly that lacks mechanical stiffness. The structure of the stationary bearing surface is such that the rotation of the disc pumps air into the bearing; building thereby a pressure profile in the bearing. The resulting lift force is a function of the bearing gap and qualifies the bearing for its stiffness.

BRIEF DESCRIPTION OF THE DRAWINGS

The novel features believed to be characteristic of the present invention are set forth in the appended claims. The invention itself as well as other features and advantages thereof will be best understood by reference to the detailed description that follows right in conjunction with the accompanying drawings wherein:

DETAILED DESCRIPTION OF A PREFERRED EMBODIMENT

A spindle motor and disc assembly for use in disc drive computer systems is disclosed herein. It is based on an integrated air-bearing using discrete pads instead of spiral grooves. The principle of the invention is the same in both cases, but the mathematics providing the principle are far easier to represent if pads are used. The pads are known in mechanical engineering under the name Sommerfeld Pad. In the following description, numerous specific details are set forth such as material types, thicknesses, speeds, etc. in order to provide a thorough understanding of the invention. It will be obvious, however, to one skilled in the art that these specific details need not be used to practice the present invention. In other instances, well known structures and processing steps have not been described in particular detail in order to avoid unnecessarily obscuring the present invention.

Finally, as previously discussed, any one of the several inventive concepts in the present invention may have separate utility in providing support and damping for a rotating disc or multiple disc system in a disc drive.

Figure 2A:
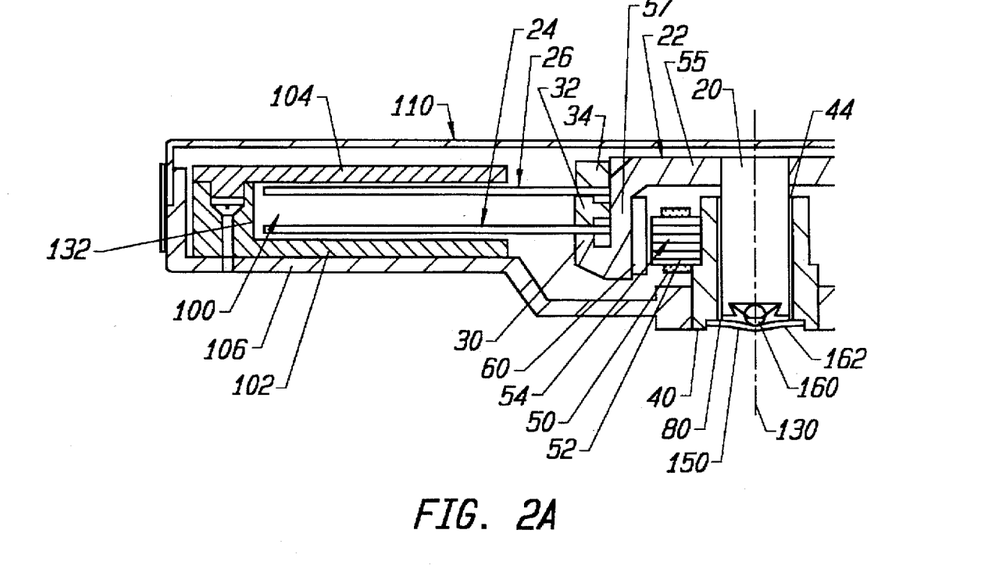
FIGS. 2A and 2B is a vertical sectional view of a disc drive embodying the three major concepts of the disc support system of the present invention.

Thus, referring to FIG. 2A, this is a cross-sectional view of one embodiment of the motor assembly of the present invention which can be used to illustrate all three of the major facets of the present invention. The motor assembly of FIG. 2A comprises a cylindrical steel or ceramic motor shaft 20 onto which is attached a hub 22 for supporting the data storage discs 24, 26. The present embodiment shows two discs being supported from the hub; it is, of course, within the scope of the present invention to support only a single disc or a plurality of discs. The discs are supported from the hub using a supporting flange 30, spacers 32 as necessary between each adjacent disc, and a clamp 34 for tightly holding the discs in place. Returning to the motor construction, the motor includes a bushing 40 formed preferably of a ceramic, steel, brass or bronze material which forms together with the steel shaft 20 a journal bearing which is a self-pressurizing air-bearing. Continuing further with the motor design description, the exterior surface of bushing 40 supports the stator 50 which includes a laminated core 52 and a series of coils 54 disposed around the laminated core.

This stator 50 resides within an internal cavity of the hub 22 which comprises horizontal portion 55 extending over the top of the stator 50 to vertical portion 57 extending vertically along stator 50 to define the motor cavity. Attached to the internal vertical surface of the hub 22 are permanent magnets 60. The magnets 60 interact electromagnetically with the coils 54 to cause rotational movement of the hub 22 and motor shaft 20 during normal operation. Electrical activation of the coil 54 to cause this motor rotation is achieved by means of terminal leads which connect to the stator 50 through a passage which can be led up through the bushing 40.

The self-pressurizing journal bearing which establishes the stability of the spindle motor utilizes a herringbone pattern on the steel shaft 20 to create pressure gradients in the gap 44 between shaft 20 and bushing 40 so that as the shaft and hub spin, pressure is created down against the open base and the vertical orientation and location of the steel shaft is accurately maintained. The use and design of such chevron patterns in hydrodynamic bearings to define pressure gradients within an air-bearing is well known.

Figure 2B:
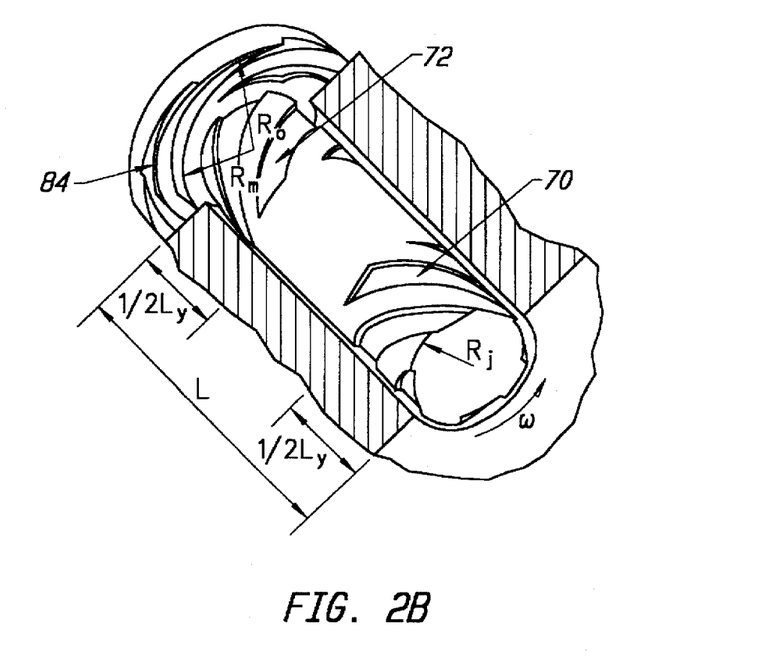

A typical pattern which may be used on the center steel shaft 20 is shown in FIG. 2B which illustrates the utilization of two separate sets of grooves 70, 72 for creating an appropriate pressure distribution pattern along the shaft as it rotates, the grooves forcing redistribution of the air in defined patterns to create the desired self-pressurizing air-bearing in the gap 44 between shaft 20 and bushing 40. In the air-bearing illustrated in FIG. 2B, a separate set of grooves 84 is shown etched in the thrust plate which rotates over the top of what would be the bushing 40. Such a set of grooves could be etched in the bottom surface of the horizontal portion 55 of hub 22 which is pressed onto the end of the shaft 20. While these additional spiral grooves 84 on the underside surface of hub 22 may lend additional stability to the air-bearing, they are not required to achieve the desired level of operational accuracy. This is especially true in the preferred embodiment of the invention which also incorporates an integrated air-bearing to provide the stiffness which the air-bearing of the spindle motor lacks.

The integrated air-bearing generally indicated at 100 is based on the air pressure build-up between pads 102, 104 which are mounted respectively above and below the surface of the top surface of the top most disc 24 of the stack and below the bottommost surface of the bottom disc 26 on the stack. As shown in this particular embodiment, the lower pad 102 is directly supported from the base casting 106 of the housing; the upper pad 104 is cantilevered up from the base so that it may accurately positioned relative to the top surface of the upper-most disc 24. However, this requires a pad of considerable stiffness; there are other approaches to mounting this pad including mounting it from the top cover 110 of the housing. Defining this thrust bearing utilizing the air pressure build-up between the two pads and the disc stack provides the moment/rocking/tilting stiffness between the disc stack and the base which is highly desirable in small form factor, high capacity disc drives, especially in the light of the use of the self-pressurizing journal bearing described above.

Figure 5A:
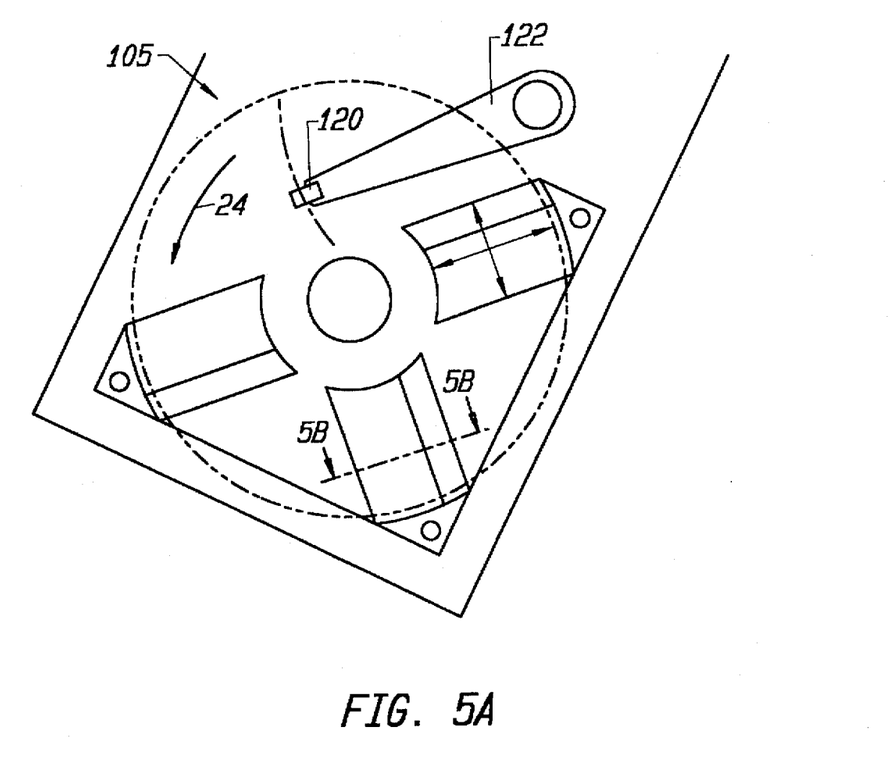
FIGS. 5A and 5B are figures which illustrate the disc thrust bearing used to support the disc in the present invention.
Figure 5B:
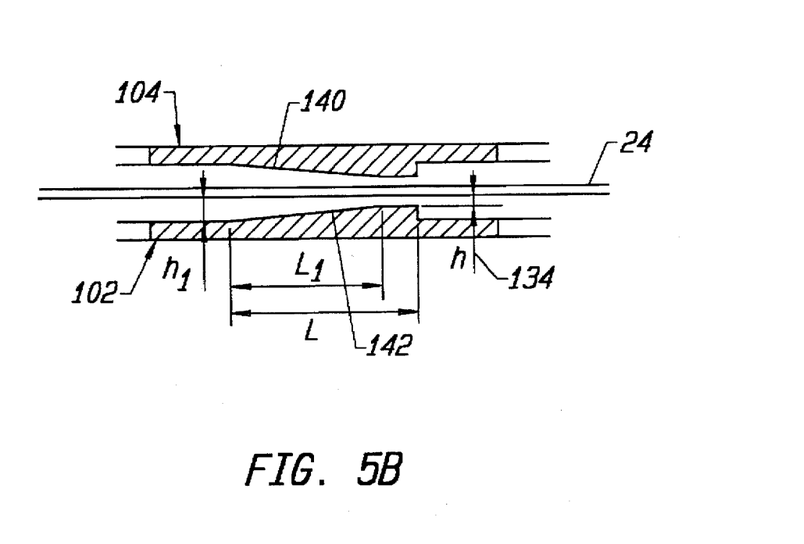

The pads shown in top plan view in FIG. 5A and in sectional elevation in FIG. 5B are typically of limited extent so that they are easily supported from the housing of the disc drive. It is essential that the pads be independently supported from the discs within the housing so that the pads do not pick up the same vibration modes as affect the discs. No pad to provide a structured surface is typically found in the region of the actuator 122, as the moving arm prevents a pad being so close as to create the desired air pressures.

Figure 7:
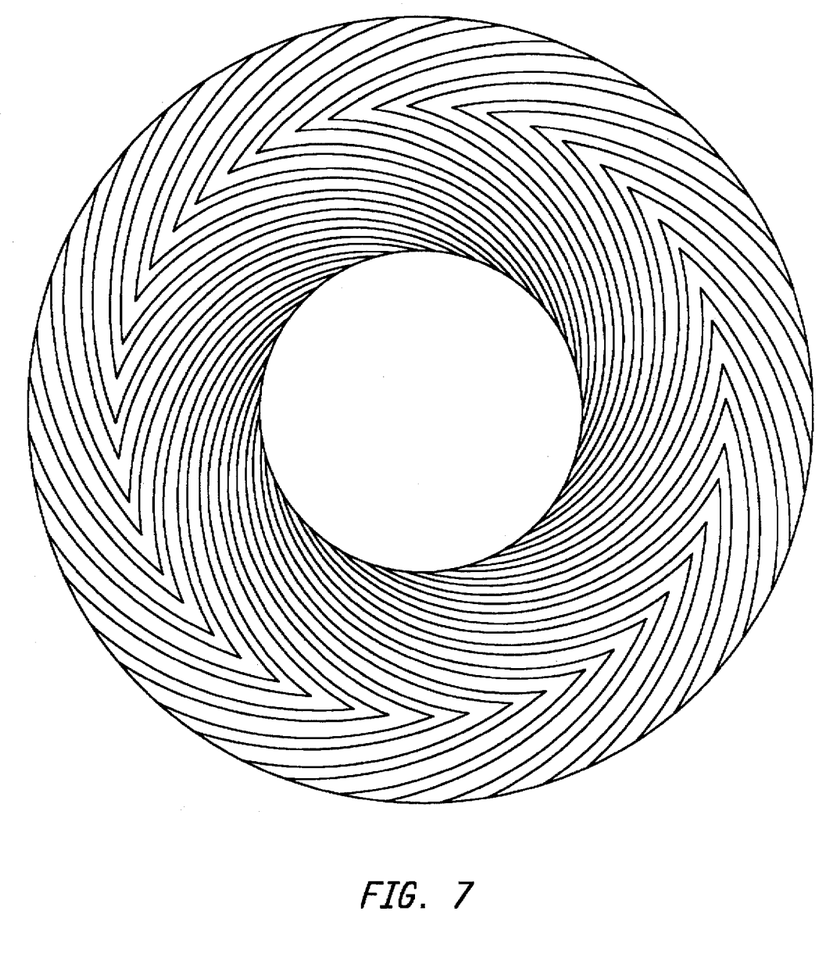
FIG. 7 is an illustration of a chevron pattern usable in the thrust bearing of this invention.

It should also be noted that in order for the surface to create the desired bearing stiffness, that it is necessary to structure or profile the surface as shown, e.g. in FIGS. 5B and 7. Other surface structures may also be adopted to achieve the desired affect.

Much of the underlying phenomena and theoretical basis for this type of air-bearing can be found in the application of David Jennings et al. entitled "Squeeze Film Damping for a Hard Disc Drive" U.S. patent application Ser. No. 08/278,796 filed simultaneously with this invention and assigned to the assignee of this invention and incorporated herein by reference. The basic phenomena on which this bearing operates can be understood by reference to FIGS. 5A and 5B. FIG. 5A is a top plan view of a disc 24 rotating over a base 105 and accessed by a transducer 120 supported on an actuator 122. The pads described above are of dimensions as shown in FIG. 5A and have a cross-sectional profile as shown in FIG. 5B. The necessary axial support and rocking or tilting stiffness of the rotor-hub-disc assembly is provided by the air-bearing build-up between the stationary pads 102, 104 and the rotating disc 24 or 26. The theoretical derivation follows, using a single disc but is equally applicable to the use of a plurality of discs.

Lift Force—$P_1$ $$P_1 = \eta \cdot B \cdot \frac{L^2}{h^2} \cdot U \cdot S_{ob}$$

$$S_{ob} \simeq 0.18 \ @ \ \frac{L_1}{L} = 0.8 \text{ and } \frac{h_1}{h} = 2.2$$

$$\frac{\partial S_{ob}}{\partial h} \simeq 0 \ @ \text{ same conditions}$$

Axial Stiffeners—$k_{ax}$ $$k_{ax} = \frac{dP_1}{dh} \cong \eta \cdot B \cdot L^2 \cdot U \cdot \left(\frac{-3}{h^3}\right) \cdot S_{ob} \cong -3 \frac{P_1}{h}$$

Sign: $h$ decreases→$P_1$ increases.

$L$, $L_1$, $h_1$, per FIG. 5B.

$\eta$: dynamic viscosity   water   $10^{-3}$
                                          glycerine   0.85   $\left[\frac{N_s}{m^2}\right]$
                                          air   $1.8 \cdot 10^5$ B: width of the bearing pad U: avg lin speed $S_{ob}$: Sommerfeld bearing number Appplication for One Pad—4000 rpm 2½ IN, L~20 mm, B~20 mm, U~9.4 m/s.

| h [mm] | $P_1$ [N] | k [N/m] | Slide Drag [N] |
|---|---|---|---|
| 0.001 | 243.6 | $7.3 \cdot 10^8$ | 0.054 |
| 0.00316 | 24.36 | $2.3 \cdot 10^7$ | 0.017 |
| 0.010 | 2.436 | $7.3 \cdot 10^5$ | 0.0054 |
| 0.0316 | 0.2436 | $2.3 \cdot 10^4$ | 0.0017 |
| 0.100 | 0.02436 | $7.3 \cdot 10^2$ | 0.00054 |

The charts shown at FIGS. 6A, 6B, 6C, 6D, 6E, 6F and 6G show the vibrational profile for discs operated at various speed, with the abscissa being the frequency of vibration and the ordinate being a transfer function representing the amplitude ratio of axial disc motion over the acceleration disc drive housing. The objective of the described system, of course, is to modify the frequency of vibration or resonance peaks by adding stiffness and reducing amplitude by adding damping.

Figure 6A:
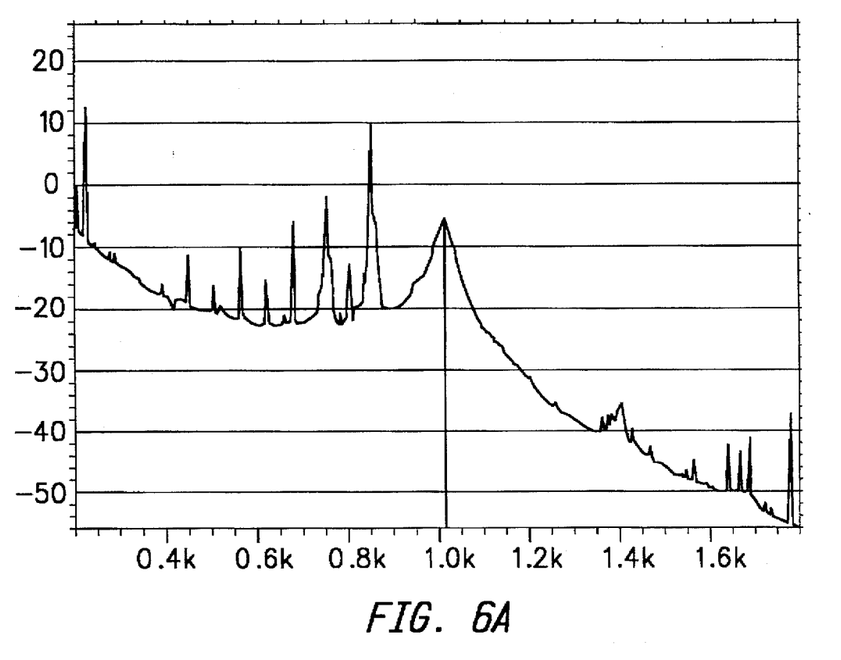
FIGS. 6A–6G are charts of tests run on the bi-directional thrust air-bearing of this invention.
Figure 6B:
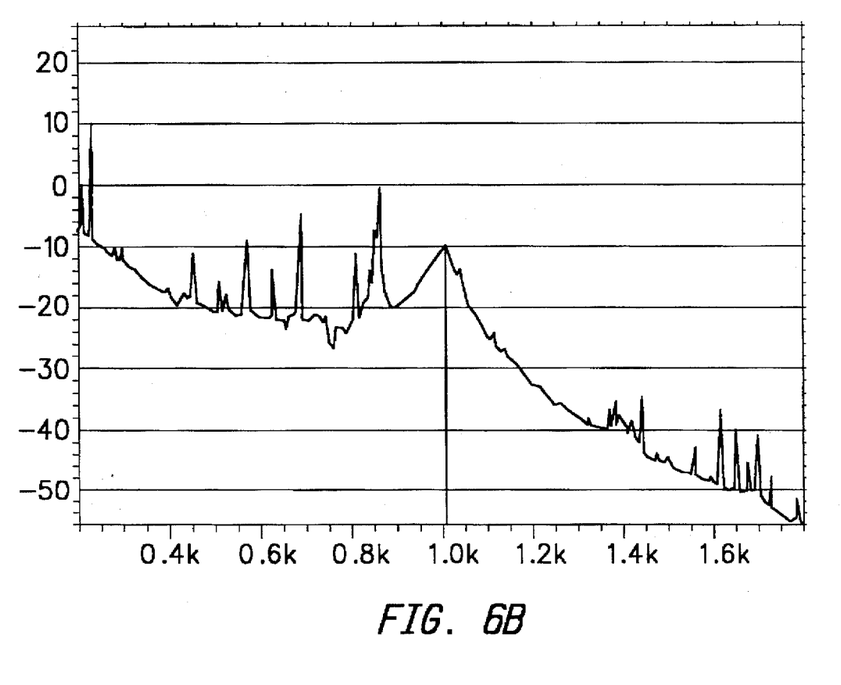
Figure 6C:
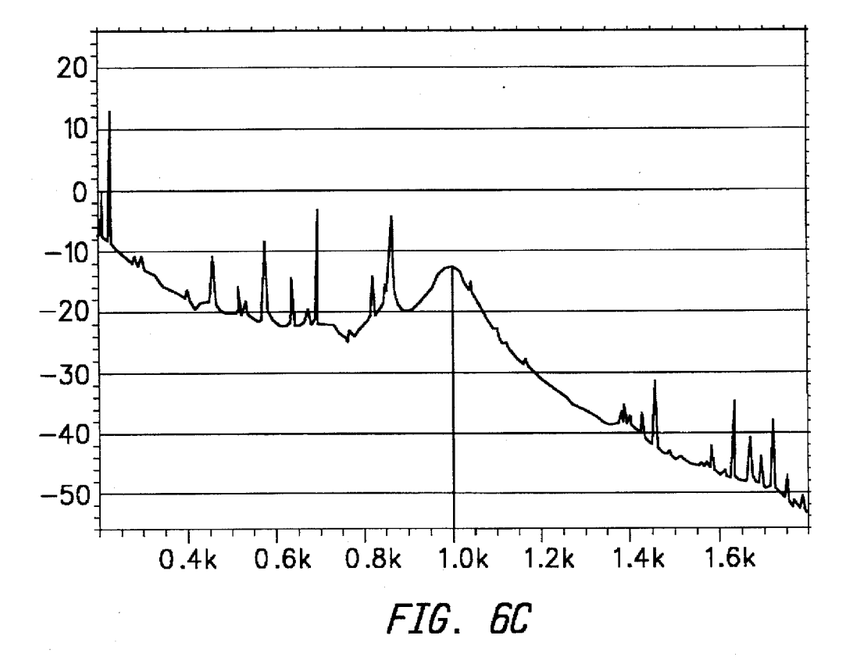
Figure 6D:
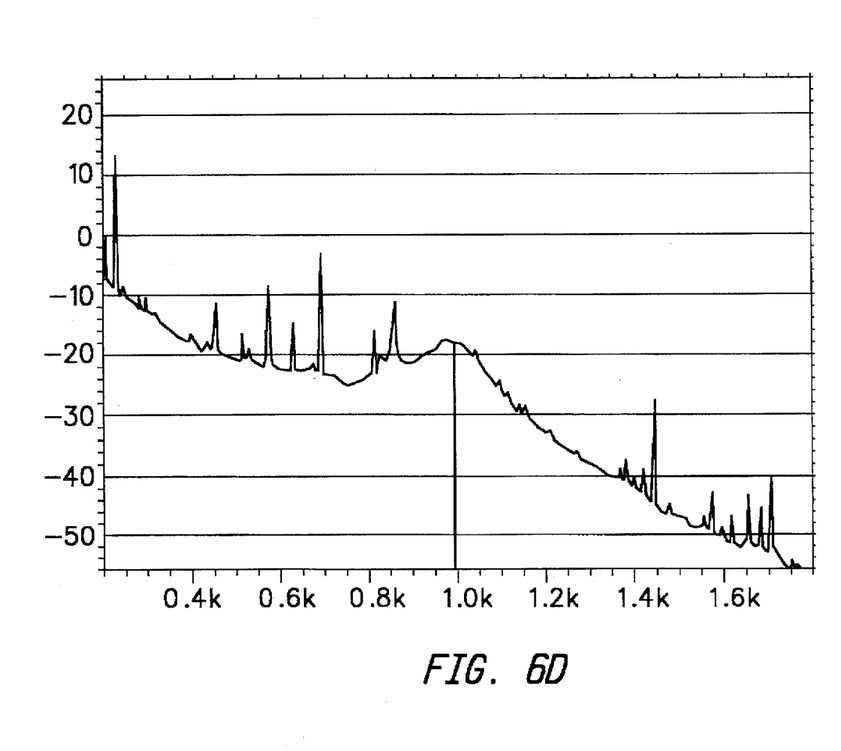
Figure 6E:
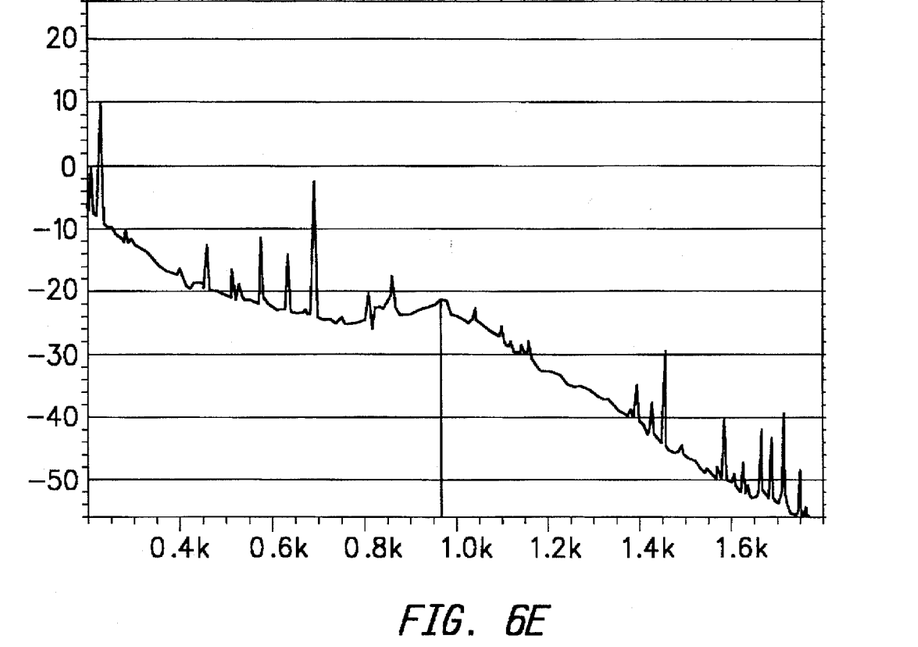
Figure 6F:
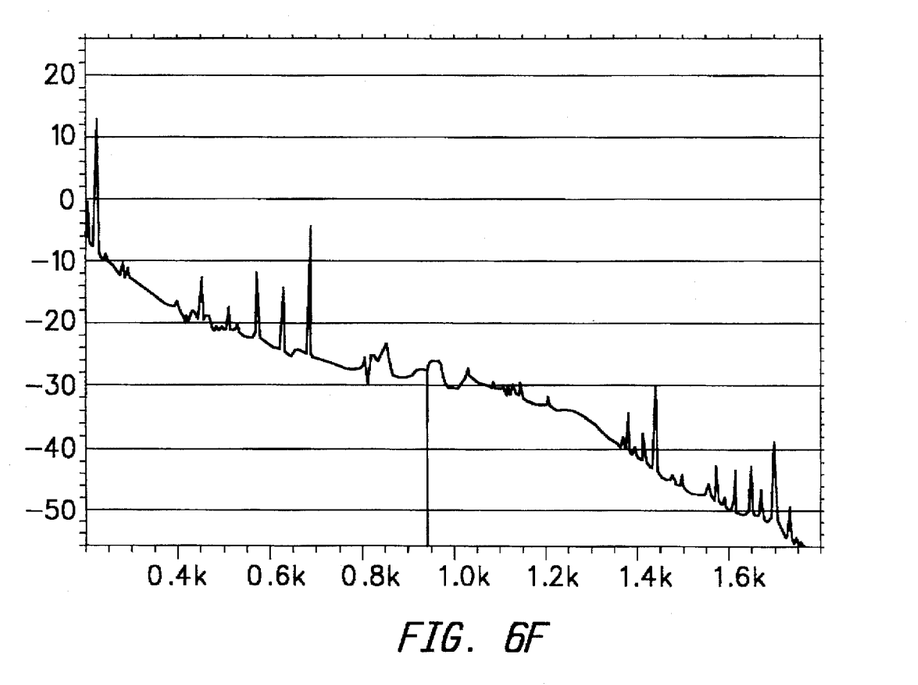
Figure 6G:
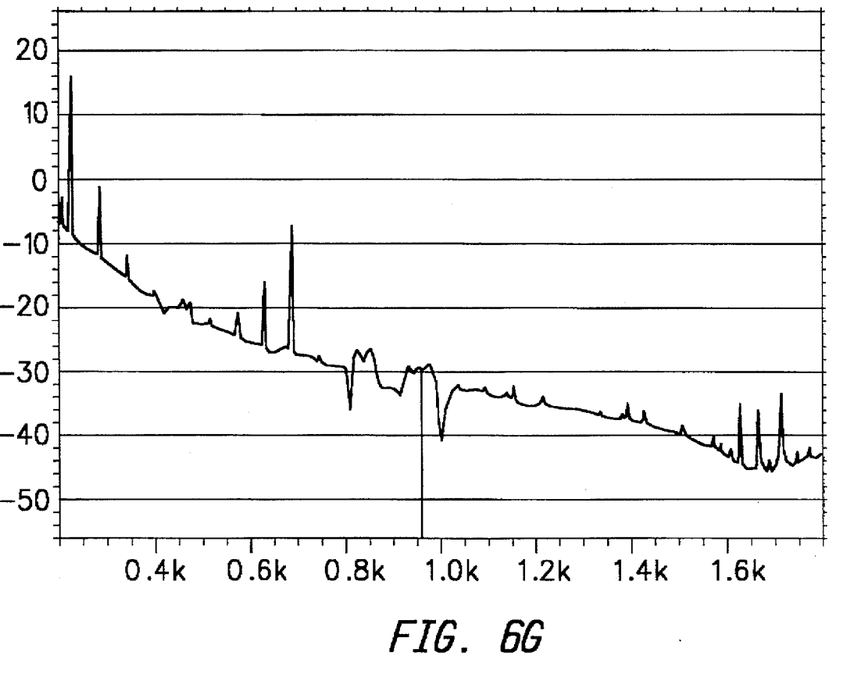

FIG. 6A shows the operational effects of operating without the thrust bearing; the remaining figures, all tests done at 3450 rpm, show the improvement achieved using different gaps. Clearly, improvement is achieved with a gap of 0.005"; more improvement results from narrower gaps. Further tests, set forth in detail in the incorporated Jennings application, show that gaps as wide as 0.010" are effective.

The above FIGS. 6A–6G have demonstrated the use of air as a lubricant, and the effectiveness of the integrated air-bearing in establishing of lifting force holding the discs supporting the read/write tracks in the proper position so that it may be stabilized and read by the transducer supported on the actuator arm. The amount of lifting force developed depends on various design parameters as shown in the FIGS. 6A–6G which are optimized according to different situations and vary especially for example, with the speed of rotation of the disc and the distant between each disc surface and the pad. Basically, as the smooth disc rotates about the rotational axis 130 defined by the shaft 20, the rotation tends to force the air through the restrictive gap 134 created between the disc surface and the pad (FIG. 5B). Overall, as the air is pushed out lift forces are developed on the disc to stabilize its motion, which are dependent as shown above on the speed of rotation, diameter of the rotating disc or its tangential velocity, the spacing or gap between one of the pads and the associated disc surface, and the surface condition.

Upon any radial shock, vibration or unbalanced load which may influence the disc 24 to shift away from a perfectly vertical orientation where the shaft 20 is parallel to the vertical axis 130, this will cause a variation in the gap thickness, and ideally the uneven pressure development will force the rotating disc 24 back to its dynamic equilibrium position. In fact, applying the well known phenomena of hydrodynamic bearings, rather than using a Sommerfeld approach as shown in FIGS. 5A and 5B, the structured surface condition of a flat pad could also be modified by applying a chevron-type design as shown in FIG. 7 to the pad surface to modify the air flow conditions and thus the pressure differential build-up.

The self-pressurizing journal bearing defined between shaft 20 and bushing 40 also contributes to the stability of this design. The chevron pattern formed on the shaft or bushing is in a preferred embodiment pushing air down against a static head defined by the end wall 150 so that the position of the shaft, and thus the hub and the discs it supports is stabilized along the vertical axis 130.

Figure 3A:
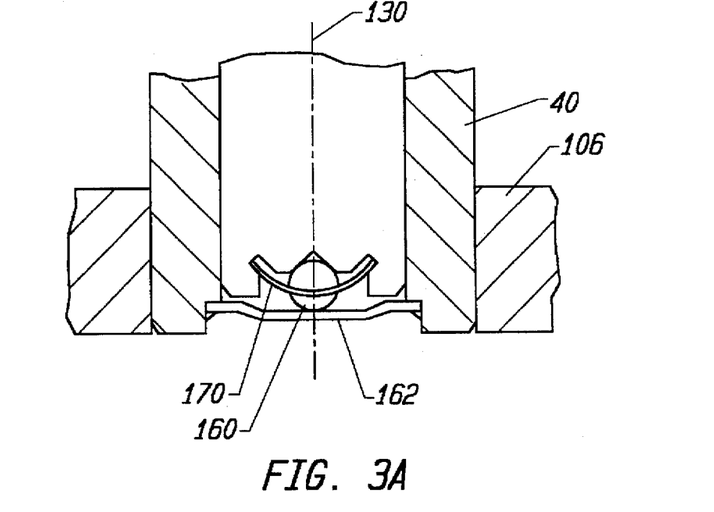
FIGS. 3A and 3B are detailed vertical sectional drawings and horizontal plan view drawing of portions of the elastic thrust bearing incorporated in the present invention.
Figure 3B:
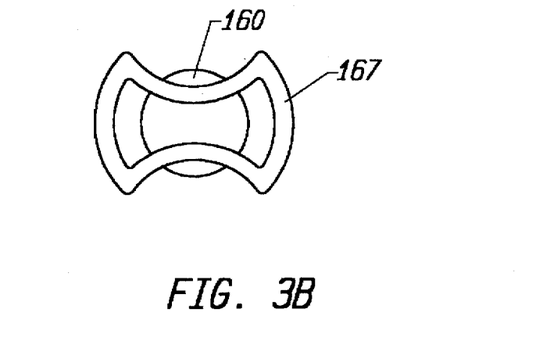

It can be seen from FIG. 2A that the position of the shaft 20 is further stabilized, especially under rest conditions, by an elastic thrust bearing which defines the axial position of the disc stack and prevents contact between the pads 102, 104 of the integrated air-bearing. This elastic thrust bearing comprises a ruby, ceramic or steel ball 160 fixed to the end of the shaft 20 and resting against an elastic shield 162 which in this particular embodiment also defines the end wall of the self-pressurizing journal bearing. The elastic thrust bearing, details of which are shown most clearly in FIG. 3A and FIG. 3B is in fact an element known under the trade name INCABLOC and used previously in the watch industry. The ball 160 which is fixed to the end of the shaft rests against an elastic shield fixed tO the sleeve portion 80 of the journal bearing. To optimize the wear characteristics, the shield 162 is of steel or tungsten-plated steel. The thrust load on this bearing is the sum of the gravitation of the disc stack and the magnetic attraction between the stator 50 and the magnet 60 of the spindle motor. The magnetic attraction between magnet 60 and stator 50 is defined by the axial location of the magnet 60 with respect to the stator 50 and the difference in length of the magnet section 60 overhanging the stator 50 on either side. The resulting force has to compensate for gravitation in any position of the drive to guarantee a contactless start of the integrated air-bearing. It is for this reason, that asymmetric magnet stator boundaries must be defined as shown in the illustration and as may be determined by experiment in order to balance these gravitational loads which will be a function of the weight of the number of discs, the weight of the hub and spacers and the shaft 20.

Because of the many unique features of the present structure, it is worthwhile to also review the manner in which the drive is assembled in a most efficient manner. The assembly essentially is based on the initial formation of three subassemblies:

The first subassembly A comprises the base 106 and lower thrust plate 102 which may be simply glued or screwed together with a screw being shown as the holding means in FIG. 2A;

Subassembly B comprises the bushing 40, the stator which itself is a single subassembly 50, and the shield 162, which is captured inside the base of the bushing 40 and as shown in FIG. 3A, glued in place;

Subassembly C comprises the stainless shaft 20, with the ball 160 affixed to the end thereof by a retaining ring 170 which itself is elastically captured in recesses in the shaft 20; the hub 22 which is preferably press fitted onto the top end of the shaft 20, and the disc stack which is assembled on the hub using the spacer 32 and disc clamp 34 in accordance with known technology.

Figure 4:
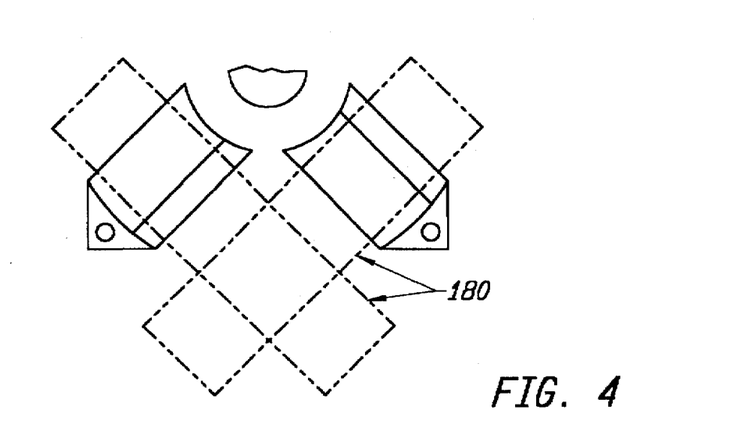
FIG. 4 is an illustration useful in explaining the assembly method of the present invention.

Having formed the three subassemblies, to complete the assembly, shim strips which are shown in FIG. 4 at 180 with a thickness equal to the nominal air gap of the air-bearing between the lower disc surface 26 and the pad 102 are laid on the pad 102 perpendicular to the bearing surfaces and covering the surfaces. Thereafter, the Subassembly C based on the shaft 20 is fitted within the bushing 40 and an adhesive bead is dispensed on the outer surface of the bushing 40 so that it can be fit into the base 106 and locked securely and permanently in the proper perpendicular orientation to the base axis. Because of the disymmetric overlap between magnet 60 and stator 50, these two subassemblies will stay together. It should be known that in the preferred embodiment, magnet overhang on the hub side is longer than on lower base casting side in order to provide a stabilizing force on the shaft overcoming the force of gravity.

The fitting together of the two previous subassemblies form the basic elements of the motor, which may now be dropped into the bore defined by the base casting with the adhesive locking the lower outer surface of the bushing securely in place into the base casting. The discs will rest on the shim strips and guarantee the correct spacing between the lower surface of the lower disc 26 and the upper surface of the pad 102.

As the glue bond between the sleeve and base 106 is set and cured, the shim strips are pulled out. Thereafter, the top thrust plate is positioned, preferably supported cantilevered from the end piece of the lower thrust plate. Alternatively, incorporating the upper pad may be deferred until after mounting of the voice coil motor, merging of the heads and assembly of the remaining elements of a standard disc drive, after which the upper pad 104 is placed and the top cover mounted.

Other features and advantages of the present invention or approaches to the method of assembly may become apparent to a person of skill in the art who studies the present invention disclosure. For example, a structured surface 140, 142 may be mounted immediately adjacent a surface of any rotating disc of the disc stack. Moreover, a structured surface of limited extent as shown in FIG. 5A or of greater extent covering most of the outside of actuator arm region may be provided adjacent more than one disc surface. Also, under certain circumstances, a fluid other than air may be used. Therefore, the scope of the present invention is to be limited only by the following claims.

What is claimed is:

1. A magnetic disc drive comprising:
   a housing including a cover and a base joined together for providing an enclosing;
   a spindle motor provided in said housing and having a shaft with first and second ends; and
   a hub mounted on said first end of said shaft, said hub supporting one or more rotatable magnetic discs for rotation by said spindle motor;
   wherein said shaft rotates within a sleeve supported within said housing, one of said shaft and said sleeve having a herringbone pattern on an axial surface thereof, said herringbone pattern forcing air through a gap defined between said sleeve and said shaft down against said base to create a self-pressurizing journal bearing for providing stable positioning for said shaft along its vertical axis; and
   wherein said second end of said shaft is supported by an axial elastic thrust bearing so that axial position of said one or more rotatable magnetic discs is stable during rotation of said shaft, said axial elastic thrust bearing including a ball rotating in a depression in said base, said ball supporting said second end of said shaft and being retained by a retaining element extending from said second end of said shaft, said retaining element biasing said ball towards said second end of said shaft.

2. A disc drive as claimed in claim 1, wherein said sleeve supports an elastic shield on an end thereof, said elastic shield forming a part of said base, said ball rotating within a depression of said shield so that said shaft is reliably supported for rotation within said sleeve without rocking and tilting of said one or more rotatable magnetic discs.

3. A disc drive as claimed in claim 2, wherein said elastic shield is formed of steel or tungsten-plated steel.

4. A disc drive as claimed in claim 2, wherein said hub is press fitted on said shaft and extends horizontally under said cover of said housing and vertically toward said base to define a cavity for said spindle motor, an inner surface of said hub supporting a magnet of said spindle motor, an outer surface of said sleeve supporting a stator of said spindle motor, said magnet cooperating with said stator to provide rotation of said shaft.

5. A disc drive as claimed in claim 4, wherein a horizontally extending portion of said hub includes a horizontal lower surface having a herringbone pattern thereon cooperating with an upper horizontal surface of said sleeve to create a thrust bearing for further stabilizing rotation of said shaft.

6. A disc drive as claimed in claim 4, wherein said magnet extends vertically along said inner surface of said hub and is asymmetric with respect to said stator to provide a force balancing the gravitational force of said shaft and said one or more rotatable magnetic discs down against said base of said housing.

7. A disc drive as claimed in claim 6, wherein said magnet extends vertically higher away from said base past said stator than below said stator of said spindle motor, thereby establishing a thrust load for compensating for the gravitational force in order to prevent contact between said one or more rotatable magnetic discs and said housing.

8. A disc drive as claimed in claim 7, wherein said shaft supports said herringbone pattern for creating a hydrodynamic pressure bearing so as to create an air pressure downward against a base end of said gap defined between said sleeve and said shaft to establish a self-pressurizing journal bearing.

9. A disc drive as claimed in claim 8, wherein said elastic shield is formed of steel or tungsten-plated steel.

10. A magnetic disc drive comprising:
    a housing including a cover and a base for providing an enclosing;
    a spindle motor provided in said housing and having a shaft with first and second ends;
    a hub mounted on said first end of said shaft, said hub supporting one or more rotatable magnetic discs for rotation by said spindle motor; and
    a voice coil motor assembly mounted adjacent said one or more rotatable magnetic discs, said voice coil motor assembly supporting at least one transducer for cooperating with at least one surface of said one or more rotatable magnetic discs so as to read and/or write information from/to said one or more rotatable magnetic discs as said one or more rotatable magnetic discs rotate;
    wherein said shaft rotates within a bushing supported from said base, one of said shaft and said bushing supporting a herringbone pattern on an axial surface thereof to create a self-pressurizing fluid-bearing for providing radial stiffness for said shaft, and for forcing air through a gap defined between said bushing and said shaft down against said base; and
    wherein said second end of said shaft is supported by a ball rotating in a depression in said base, said ball being retained by a retaining element extending from said second end of said shaft, said retaining element biasing said ball towards said second end of said shaft.

11. A disc drive as claimed in claim 10, wherein a horizontal surface of said hub comprises a herringbone pattern cooperating with a horizontal surface of said bushing to create a thrust bearing for further stabilizing rotation of said shaft.

12. A disc drive as claimed in claim 10, wherein said bushing supports a shield on an end thereof, said shield forming a part of said base, said ball rotating within a hollow of said shield so that said shaft is reliably supported for rotation within said bushing without rocking and tilting of said one or more rotatable magnetic discs.

13. A disc drive as claimed in claim 12, wherein said shield is formed of steel or tungsten-plated steel.

14. A disc drive as claimed in claim 10, wherein said hub is press fitted on said shaft and extends horizontally under said cover of said housing and vertically toward said base to define a cavity for said spindle motor, an inner surface of said hub supporting a magnet of said spindle motor, an outer surface of said bushing supporting a stator of said spindle motor, said magnet cooperating with said stator to provide rotation of said shaft.

15. A disc drive as claimed in claim 14, wherein said magnet extends vertically along said inner surface of said hub and is asymmetrical with respect to said stator to provide a force balancing the gravitational force of said shaft down against said base of said housing.

16. A disc drive as claimed in claim 15, wherein said magnet extends vertically higher away from said base past said stator than said magnet extends lower past said stator of said spindle motor, thereby establishing a thrust load for compensating for the gravitational force in order to prevent contact between slid one or more rotatable magnetic discs and any portion of said housing.

17. A disc drive as claimed in claim 16, wherein said shaft supports said herringbone pattern for creating a hydrodynamic pressure bearing so as to create an air pressure downward against a base end of said gap defined between said bushing and said shaft to establish a self-pressurizing journal bearing.

18. A disc drive as claimed in claim 17, wherein said bushing supports a spring member on an end thereof, said spring member forming a part of said base, said ball rotating within a depression of said spring member so that said shaft is reliably supported for rotation without rocking and tilting of said one or more rotatable magnetic discs.

19. A disc drive as claimed in claim 18, wherein said spring member is formed of steel or tungsten-plated steel.

* * * * *